April 21, 1942.  C. STEENSTRUP  2,280,554
REFRIGERATOR CABINET
Filed Sept. 27, 1940  2 Sheets-Sheet 1
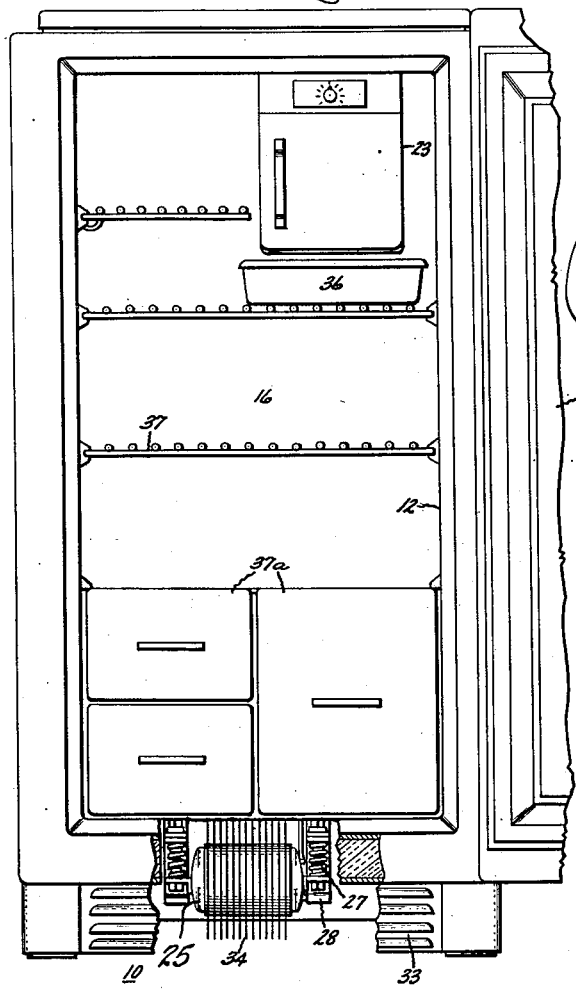
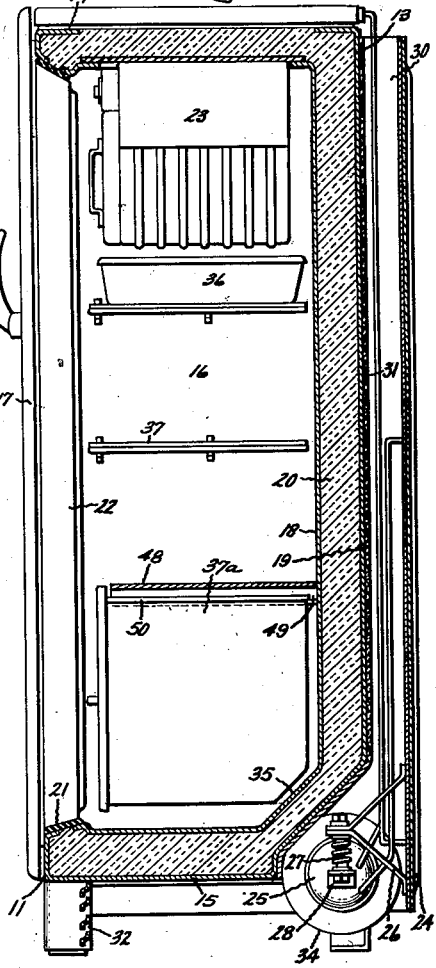
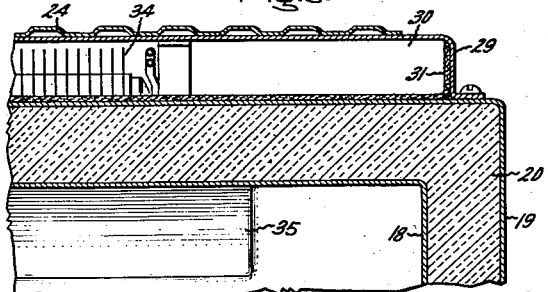
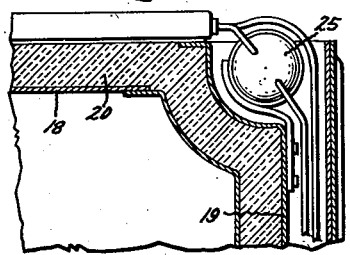
Inventor:
Christian Steenstrup,
by Harry E. Dunham
His Attorney.

April 21, 1942.  C. STEENSTRUP  2,280,554
REFRIGERATOR CABINET
Filed Sept. 27, 1940  2 Sheets-Sheet 2

Inventor:
Christian Steenstrup,
by Harry E. Dunham
His Attorney.

Patented Apr. 21, 1942

2,280,554

UNITED STATES PATENT OFFICE 2,280,554

REFRIGERATOR CABINET

Christian Steenstrup, Schenectady, N. Y., assignor to General Electric Company, a corporation of New York Application September 27, 1940, Serial No. 358,684

6 Claims. (Cl. 62—89)

This invention relates to refrigerator cabinets.

It is an object of my invention to provide a new and improved refrigerator cabinet in which the food storage space extends substantially the full depth and length of the cabinet whereby substantially all of the space occupied by the cabinet is available for food storage purposes.

Further objects and advantages of my invention will become apparent as the following description proceeds and the features of novelty which characterize my invention will be pointed out with particularity in the claims annexed to and forming a part of this specification.

Figure 4:
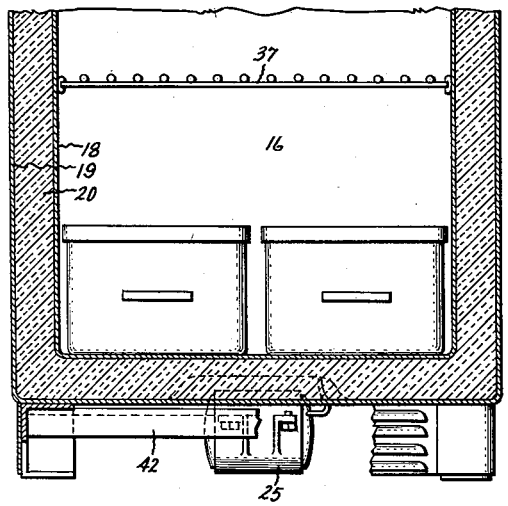
Figure 5:
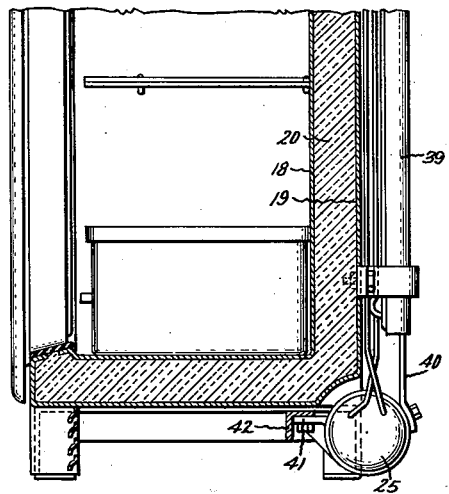
Figure 6:
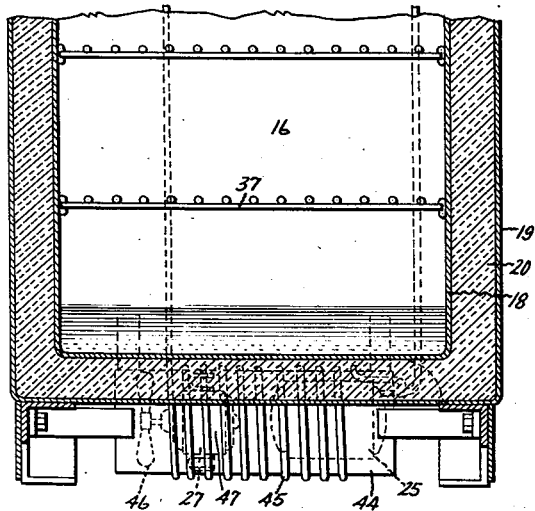
Figure 7:
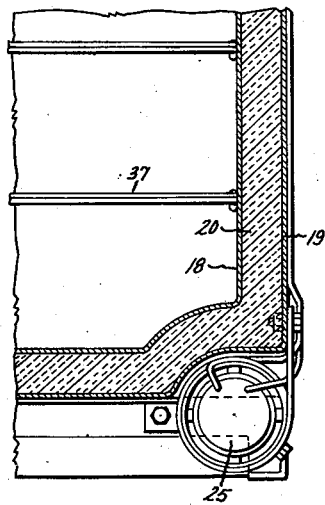

For a better understanding of my invention reference may be had to the accompanying drawings in which Fig. 1 is a front elevational view, partly in section and partly broken away, illustrating a refrigerator cabinet of the domestic type embodying my invention, Fig. 2 is a side elevational sectional view of the cabinet shown in Fig. 1, Fig. 3 is a partly enlarged horizontal sectional view of the cabinet shown in Figs. 1 and 2, Fig. 4 is a partial sectional view of a cabinet illustrating a second embodiment of my invention, Fig. 5 is a side elevational sectional view of the embodiment shown in Fig. 4, Fig. 6 is a partial front elevational view in section of a third embodiment of my invention, Fig. 7 is a partial side elevational view in section of the cabinet shown in Fig. 6, and Fig. 8 is a partial side elevational view in section of still another embodiment of my invention.

One embodiment of my invention is shown in Figs. 1 to 3, inclusive. There is illustrated a refrigerator cabinet 10 having a front wall 11, side walls 12, rear wall 13, top wall 14 and bottom wall 15. The inner surfaces of these walls define a food storage compartment 16 which occupies substantially all of the space taken up by the cabinet. A single opening is provided in the front wall of the cabinet to permit access to the compartment 16, a suitable door 17 being provided for closing the access opening. Thus, the compartment or space 16 extends substantially the full length and full width and depth of the cabinet, and has a horizontal cross section which is generally rectangular in outline.

The walls of the cabinet are thermally resistant, and are illustrated as comprising suitably formed inner and outer shells 18 and 19, respectively, with suitable thermal insulating material 20 disposed therebetween. The opening between the shells at the door opening is closed by means of a thermally resistant breaker strip 21. The door 17 is similarly formed from inner and outer metallic shells with thermally insulating material disposed therebetween, the space between the shells being closed by thermally resistant breaker strips 22.

In order to cool the air in the food storage space 16 of the refrigerator defined by the wall portions of the liner 18, I have provided refrigerating apparatus including a cooling unit or evaporator 23, a condenser 24 on the outside of the rear wall of the cabinet and a motor-compressor unit sealed in a shell 25 disposed in the vicinity of the lower rear edge of the cabinet. In the illustrative form of my invention, the evaporator 23 is arranged in the upper portion of the compartment or space 16 at one side thereof. It will be understood that the vaporization of refrigerant in the evaporator removes heat from the space 16. The vaporized refrigerant is removed from the evaporator by operation of the compressor. Compressed refrigerant vapor is discharged from the compressor unit into the condenser 24, liquid refrigerant therefrom being returned to the evaporator 23. Inasmuch as the operation of the refrigerating system is conventional, a full illustration and description of the component parts is believed unnecessary.

In the past, mechanical refrigerators have been provided with cabinets in which a large portion of the total cabinet volume has been occupied by the refrigerating apparatus. As shown in Figs. 1 and 2, I have provided a motor-compressor unit of the sealed-in type and which is generally cylindrical in shape and disposed with its principal axis extending horizontally. The motor-compressor unit 25 is supported at the lower rear edge of the cabinet. I have provided a resilient mounting in the form of a bracket 26 at each end of the unit suitably secured to the condenser 24. The unit 25 depends from the brackets 26, being resiliently supported therefrom as by means of springs 27 extending between brackets 28 secured to each end of the unit 25 and the brackets 26. This arrangement is efficacious in minimizing the transmission of noise and vibration to the condenser and the cabinet. The side edges of the condenser 24 are provided with flanged portions 29, the flanges serving to space the condenser from the rear wall 13, provide means for securing the condenser to the cabinet, and also to define a vertical flue 30 for the passage of air. In order further to minimize the transmission of sound from the unit 25 the rear wall 13 and the inner surfaces of the flanged portions of the condenser may be provided with suitable sound insulation 31. The bottom wall 15 is spaced above the floor or surface on which the cabinet rests a sufficient distance to provide a passage 32 for the admission of air to assist in the cooling of the compressor unit 25 and the condenser 24. The emission of heat from the unit 25 and the condenser 24 causes an upward current of air through the flue 30. Air will flow into the passage 32 from the front of the cabinet to replace the rising air. Thus, a circulation of cool air is established through the passage 32 across the unit 25 and up across the inner face of the condenser 24. The convection currents set up by the condenser 24 will also cause air to move upwardly over the outer surface of the condenser. I have provided a suitable grille or louver assembly 33 at the front of the cabinet at the outer end of the passage 32 in order to improve the appearance of the cabinet. If desired, heat exchange surfaces or fins 34 may be employed on the motor compressor unit in order to increase the emission of heat therefrom.

In order to permit the utilization of substantially all of the space occupied by the cabinet for food storage purposes, the unit 25 is disposed substantially entirely outside of the outlines of the space 16 or, in other words, outside of the space defined by the planes of the principal walls of the inner liner and, in the illustrated form of my invention, as best seen from Fig. 2, substantially all of the unit 25 lies rearwardly or beyond the plane of the inner surface of the rear wall portion of the cabinet, that is, the plane of the bottom wall portion of the cabinet, which, in Fig. 2 is the bottom wall of the liner 18. In the arrangement shown in Figs. 1 to 3 in which fins are employed on the casing, it may be necessary to recess inwardly the inner liner 18 as indicated by the numeral 35 in order to provide sufficient space for the circulation of cooling air. It will be seen that the above described arrangement minimizes the overall space requirements of the cabinets without subtracting any substantial volume from the food storage space. In order to minimize still further the reduction of the food storage volume caused by the recessed portion 35, the insulation space between the inwardly displaced portions of the liners 18 and 19 may be slightly reduced so that the layer of insulation is reduced at this point.

In order to accommodate the storage of various types of foods, I have illustrated the use of a cold storage receptacle or meat pan 36, below the evaporator 23, a plurality of shelves 37 of a suitable type and suitably arranged throughout the food storage space, and also, a plurality of food storage receptacles 37a of suitable size and preferably disposed in the lower portion of the storage compartment for convenience of access and efficient utilization of space. Placement of the receptacles 37a in the lower part of the space 16 and arranging these receptacles so that they are slidably carried as by a combination shelf and cover 48 having a support or trackway 49 for cooperation with flanges 50 along the upper edges of the receptacles. With this arrangement the difficulty of reaching the lower portions of the compartment is minimized and the vertical height of the refrigerator is held to a minimum.

The above described arrangement of a refrigerator cabinet is extremely advantageous because the food storage volume for any given external size may be greatly increased as compared to the conventional domestic type refrigerator in which a very large proportion of the total space occupied by the cabinet is taken up by a machinery compartment. For example, applicant has found that the arrangement illustrated in Figs. 1 to 3 will provide approximately 11 cu. ft. of storage space in a cabinet having external dimensions substantially the same as those of the current 8 cu. ft. model made and sold by applicant's assignee.

In Figs. 4 and 5 there is illustrated an embodiment of my invention in which the motor compressor unit 25 is used without any external cooling fins. This arrangement provides a slight additional volume of food storage space inasmuch as it is not necessary to displace or recess the inner liner 18. In this form of my invention the unit 25 is illustrated as being supported directly from the condenser 39 by means of a bracket 40 suitably secured to the casing of the unit 25 and from the cabinet by a bracket 41 suitably secured to an angle 42 extending across the cabinet.

In the form of my invention illustrated in Figs. 6 and 7, the overall space requirements of the cabinets are reduced by placing the condenser as well as the motor-compressor unit at the lower rear edge of the cabinet. The condenser comprises cylindrical member 44 having a spirally disposed refrigerant conducting conduit 45 suitably arranged thereon. The motor-compressor unit 25 is suitably supported as by means of resilient mounts within and at one end of the cylinder 44, the cylinder being open at each end. In order to promote the circulation of air across the unit 25 and over both surfaces of the condenser 45, I have provided a suitable fan or blower 46 driven by a suitably supported motor 47, the fan and motor being disposed in the cylinder 44 at the other end thereof.

While I have described several embodiments of my invention, various modifications will occur to those skilled in the art. For example, instead of disposing the motor-compressor unit 25 of Figs. 1 to 5, inclusive, or the refrigerating unit of Figs. 6 and 7 at the lower rear edge of the cabinet, these elements may be disposed at the upper rear edge of the cabinet.

In Fig. 8 there is illustrated a modification of my invention in which the motor-compressor unit 25 is disposed adjacent the rear edge of the cabinet 10 and substantially above the plane of the inner surface of the top wall portion of the cabinet 10.

While I have shown a particular embodiment of my invention, I do not desire my invention to be limited to the particular construction shown and described and I intend in the appended claims to cover all modifications within the spirit and scope of my invention.

What I claim as new and desire to secure by Letters Patent of the United States is:

1. A refrigerator comprising a cabinet having an access opening therein and thermally resistant walls, supporting means for spacing the lowermost of said walls in close proximity to a floor, the inner surface of said walls defining a food storage space, thermally insulated door means for closing said access opening, said space extending substantially the full length, width and depth of said refrigerator, refrigerating apparatus comprising a cooling element for refrigerating said space, a motor compressor unit, and a condenser located outside the rear wall of said cabinet, said unit being disposed outside said storage space and substantially between the plane of the inner surface of the rear wall and the plane of said condenser and below the plane of the inner surface of the bottom wall of the cabinet.

2. A refrigerator comprising a cabinet having an access opening therein and thermally resistant walls, supporting means for spacing the lowermost of said walls in close proximity to the base or floor on which the refrigerator rests, the inner surface of said walls defining a food storage space which is generally rectangular in horizontal cross-section, thermally insulated door means for closing said access opening, said space extending substantially the full length, width and depth of said refrigerator, refrigerating apparatus comprising a cooling element for refrigerating said space, a motor compressor unit, and condensing means located adjacent to the rear wall of said cabinet, said unit being disposed substantially entirely outside the outlines of said rectangular cross-section of said storage space and substantially between the plane of the inner surface of the rear wall portion and the plane of the condensing means in such a way that substantially no space available for storage purposes is occupied by said unit but yet said unit is contained substantially entirely within the outlines of said refrigerator.

3. A refrigerator comprising a cabinet having an access opening therein and thermally resistant walls, supporting means for spacing the lowermost of said walls in close proximity to the base or floor on which the refrigerator rests, the inner surface of said walls defining a food storage space generally rectangular in cross section and extending substantially the full length, width, and depth of said refrigerator, thermally insulated door means for closing said access opening, and refrigerating apparatus comprising a motor compressor unit, a cooling element for refrigerating said space, and a flat-type condenser located adjacent the rear wall of said cabinet, said unit being disposed closely adjacent a rear edge of the cabinet substantially between the plane of the inner surface of the rear wall of said cabinet and the plane of the condenser and substantially below the inner surface of the bottom wall of said cabinet.

4. In combination with a refrigerator cabinet of the type having a wall structure comprising inner and outer sheet metal liners with thermal insulating material disposed therebetween, the inner liner defining a food storage compartment or space and having an access opening and a cooperating thermally insulated door, the insulated vertical walls extending substantially the full vertical distance from the floor or base on which the cabinet stands and the insulated horizontal walls extending substantially the full depth and width of the cabinet in order that the storage space will extend substantially the full length, width and depth of the cabinet, the lower rear edge of said inner and outer liners having a recessed portion, a refrigerating unit for cooling the storage space, said unit including a compressor, a motor for driving said compressor, and a shell enclosing said compressor and motor, said shell being disposed outside said storage space closely adjacent said recessed portion and below the lower end of the rear wall of the said cabinet, and substantially between the planes of the inner and outer liners whereby said shell is contained substantially entirely within said cabinet but substantially no storage space is occupied thereby.

5. In a refrigerator cabinet of the type having walls comprising inner and outer sheet metal liners with thermal insulating material disposed therebetween, the inner liner defining a food storage compartment or space and having an access opening and a cooperating thermally insulated door, the insulated vertical walls extending substantially the full vertical distance from the floor or base on which the cabinet stands and the insulated horizontal walls extending substantially the full depth and width of the cabinet in order that the storage space will extend substantially the full length, width and depth of the cabinet, one of the rear edges of said inner and outer liners having a recessed portion, a refrigerating unit for cooling the storage space, said unit including a compressor, a motor for driving said compressor, and a shell enclosing said compressor and motor, said shell being disposed outside of said storage space closely adjacent said recessed portion and substantially between the planes of the inner and outer liners whereby said shell is contained substantially entirely within said cabinet but substantially no storage space is occupied thereby.

6. In a refrigerator cabinet of the type having walls comprising inner and outer sheet metal liners with thermal insulating material disposed therebetween, the inner liner defining a food storage compartment or space and having an access opening and a cooperating thermally insulated door, the insulated vertical walls extending substantially the full vertical distance from the floor or base on which the cabinet stands and the insulated horizontal walls extending substantially the full depth and width of the cabinet in order that the storage space will extend substantially the full length, width, and depth of the cabinet, a refrigerating unit for cooling the storage space, said unit including a compressor, a motor for driving said compressor, and a shell enclosing said compressor and motor, said shell being disposed outside of said storage space but within the external outline of said cabinet, closely adjacent a wall thereof, and substantially between the planes of the inner and outer liners, whereby said shell is contained substantially entirely within said cabinet but substantially no storage space is occupied thereby.

CHRISTIAN STEENSTRUP.